(12) United States Patent
Doucet et al.

(10) Patent No.: US 7,835,056 B2
(45) Date of Patent: Nov. 16, 2010

(54) IMAGE PROJECTOR WITH FLEXIBLE REFLECTIVE ANALOG MODULATOR

(75) Inventors: Michel Doucet, Saint-Augustin-de-Desmaures (CA); Maxime Savard, Neufchâtel (CA); Francis Picard, Saint-Augustin-de-Desmaures (CA); Keith Niall, Toronto (CA)

(73) Assignee: Her Majesty the Queen in Right of Canada, as represented by Institut National d'Optique (CA)

( * ) Notice: Subject to any disclaimer, the term of this patent is extended or adjusted under 35 U.S.C. 154(b) by 0 days.

(21) Appl. No.: 11/433,647

(22) Filed: May 12, 2006

(65) Prior Publication Data
US 2006/0291269 A1    Dec. 28, 2006

(30) Foreign Application Priority Data
May 13, 2005    (CA) .................................. 2507177

(51) Int. Cl.
*G02B 26/00*    (2006.01)
(52) U.S. Cl. .................................... 359/237
(58) Field of Classification Search ............. 359/237, 359/223, 224, 290, 291, 292, 571, 572, 573, 359/220, 318, 319, 320, 323, 324
See application file for complete search history.

(56) References Cited

U.S. PATENT DOCUMENTS

| 3,886,310 A | 5/1975 | Guldberg et al. |
| 4,317,611 A | 3/1982 | Petersen |
| 4,441,791 A | 4/1984 | Hornbeck |
| 4,615,595 A | 10/1986 | Hornbeck |
| 4,662,746 A | 5/1987 | Hornbeck |
| 4,758,068 A * | 7/1988 | Aughton et al. ............. 369/100 |
| 5,061,049 A | 10/1991 | Hornbeck |
| 5,083,857 A | 1/1992 | Hornbeck |
| 5,096,279 A | 3/1992 | Hornbeck et al. |
| 5,212,582 A | 5/1993 | Nelson |
| 5,216,537 A | 6/1993 | Hornbeck |
| 5,233,456 A | 8/1993 | Nelson |
| 5,293,511 A | 3/1994 | Poradish et al. |

(Continued)

FOREIGN PATENT DOCUMENTS

CA    2464207    10/2008

OTHER PUBLICATIONS

International Search Report for PCT/CA2006/000774 mailed Aug. 28, 2006.

*Primary Examiner*—Ricky L Mack
*Assistant Examiner*—Tuyen Q Tra
(74) *Attorney, Agent, or Firm*—Ungaretti & Harris LLP

(57) ABSTRACT

An image projector comprises a plurality of flexible reflective analog modulators (FRAMs), an illumination optics for focusing at least one light source thereon, a conversion optics for converting the variations in divergence of the beams reflected therefrom into variations in intensity, and a scanning mechanism coupled to a projection optics for displaying an image, constructed of intensity modulated light dots or pixels, on a screen. FRAM curvatures, responsible for determining the divergence of the reflected beams, and ultimately the intensity of each pixel, are varied by an actuation voltage that can be modulated using waveforms that minimize the FRAM response times. For multicolor images, three laser light sources operating at different wavelengths are used in conjunction with three linear FRAM arrays.

39 Claims, 10 Drawing Sheets

U.S. PATENT DOCUMENTS

| | | |
|---|---|---|
| 5,312,513 A | 5/1994 | Florence et al. |
| 5,331,454 A | 7/1994 | Hornbeck |
| 5,382,961 A | 1/1995 | Gale |
| 5,392,151 A | 2/1995 | Nelson |
| 5,444,566 A | 8/1995 | Gale et al. |
| 5,982,553 A * | 11/1999 | Bloom et al. ............... 359/627 |
| 6,025,951 A | 2/2000 | Swart et al. |
| 6,147,789 A | 11/2000 | Gelbart |
| 6,236,491 B1 * | 5/2001 | Goodwin-Johansson .... 359/291 |
| 6,268,948 B1 | 7/2001 | Gelbart |
| 6,462,858 B1 * | 10/2002 | MacDonald et al. ......... 359/290 |
| 6,466,354 B1 * | 10/2002 | Gudeman .................... 359/247 |
| 6,661,561 B2 | 12/2003 | Fitzpatrick et al. |
| 6,954,302 B2 * | 10/2005 | Sayyah et al. ................ 359/291 |
| 7,088,493 B2 * | 8/2006 | Alain et al. .................. 359/291 |
| 7,116,380 B2 * | 10/2006 | Welch et al. ................. 348/771 |
| 7,227,594 B2 * | 6/2007 | Victor et al. ................. 348/774 |
| 7,370,185 B2 * | 5/2008 | Piehl et al. ...................... 713/1 |
| 2002/0150377 A1 * | 10/2002 | Gelbart ........................ 385/140 |
| 2002/0154380 A1 | 10/2002 | Gelbart |

* cited by examiner

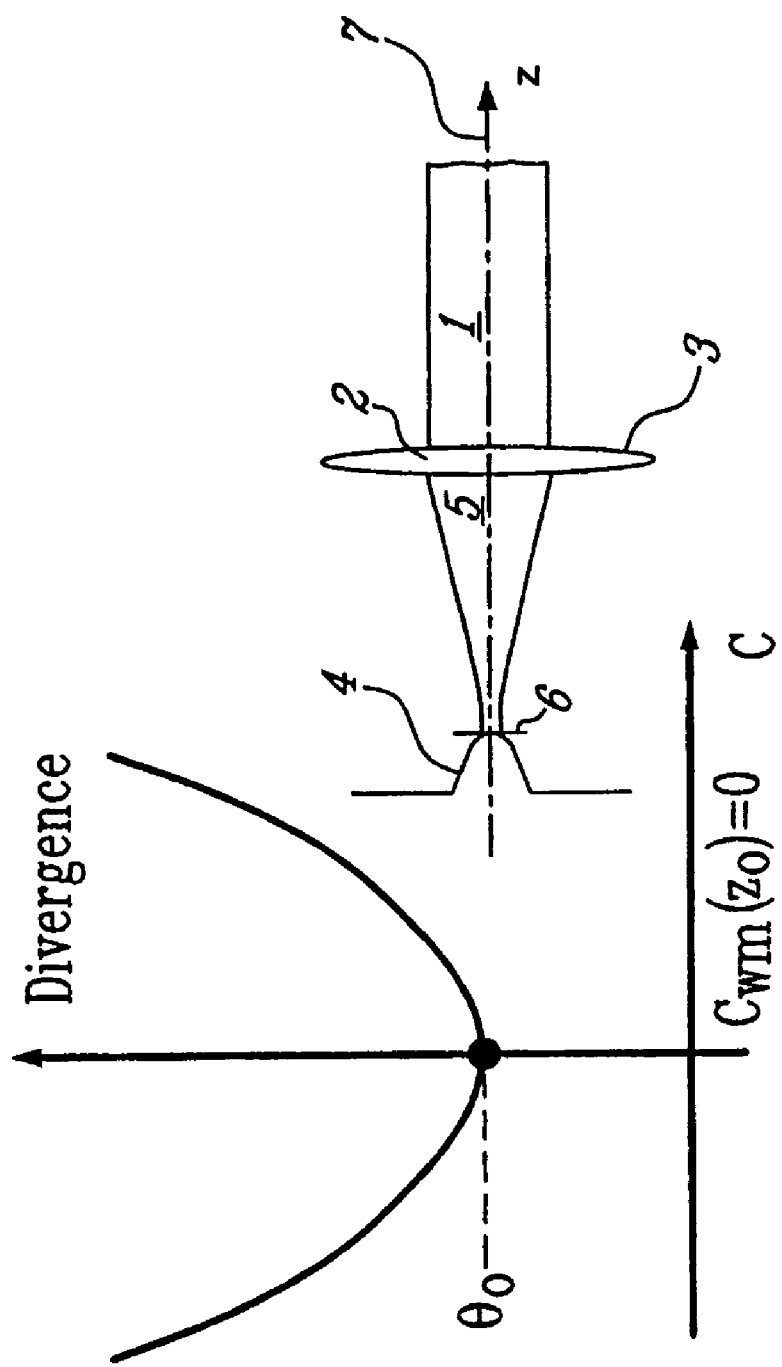

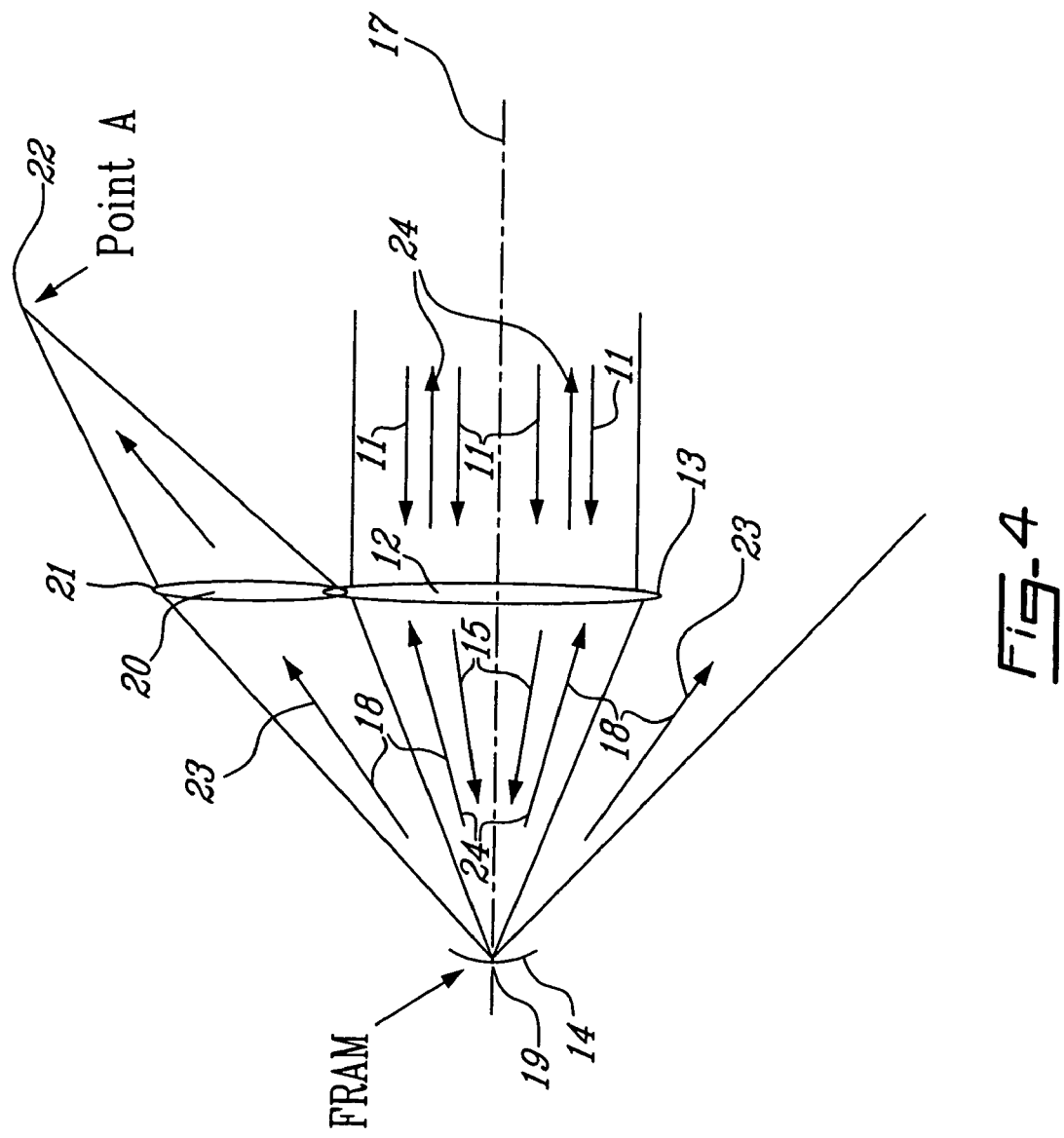

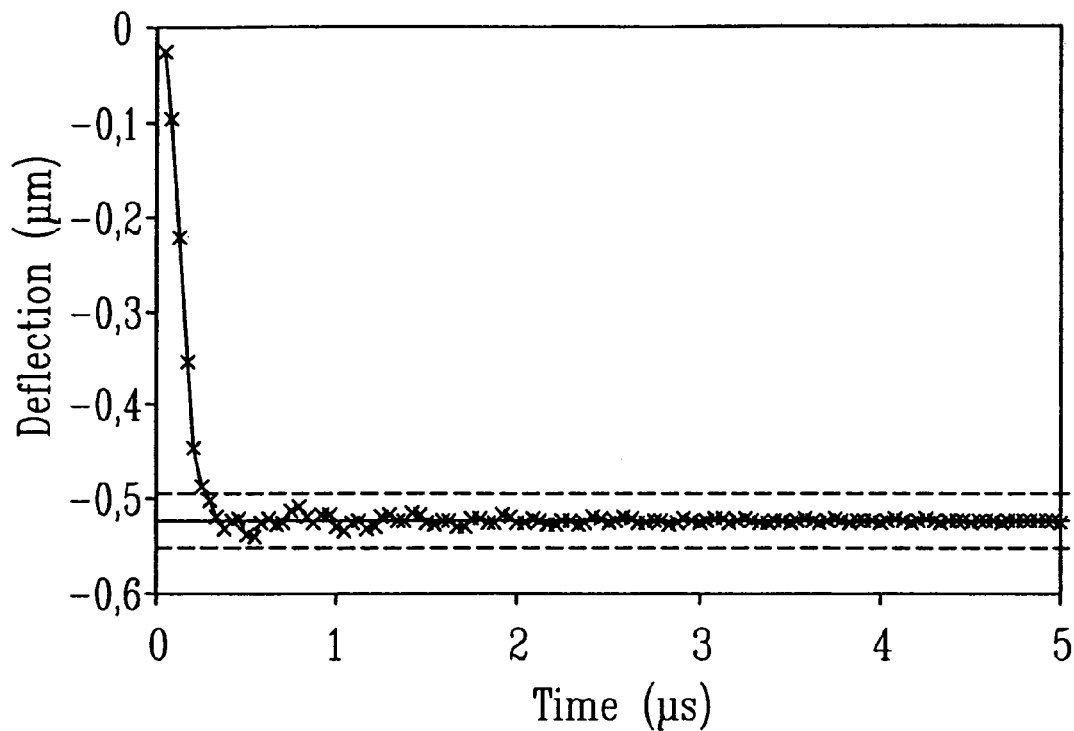
FIG-10
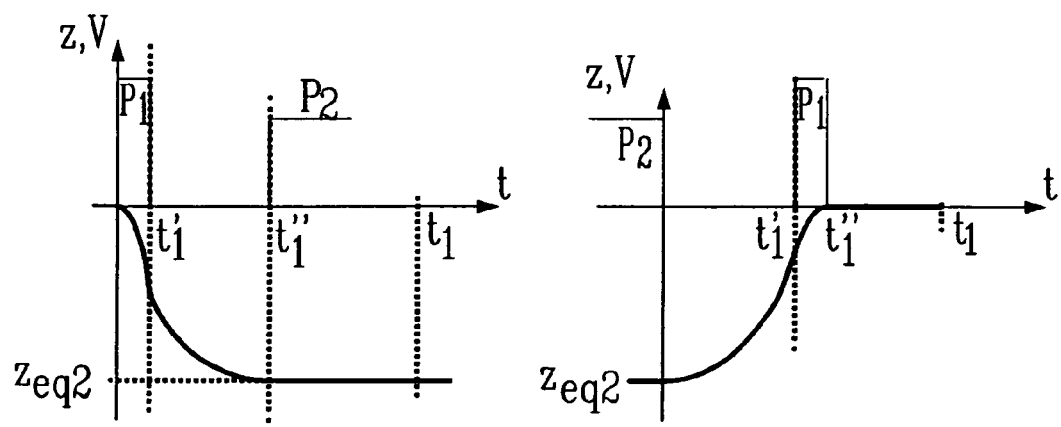
FIG-11A  FIG-11B

IMAGE PROJECTOR WITH FLEXIBLE REFLECTIVE ANALOG MODULATOR

CROSS REFERENCE TO RELATED APPLICATIONS

This application claims priority on pending Canadian application no 2,507,177 filed on May 13, 2005, and is herein incorporated by reference.

FIELD OF THE INVENTION

The present invention relates to an image projection system comprising micromirror based light modulators, more specifically comprising at least one array of flexible reflective analog modulators (FRAMs) configured to project a bidimensional monochromatic or multicolour image.

BACKGROUND OF THE INVENTION

Light modulators find applications in a variety of fields including projection displays for entertainment or training, printing, machine vision and so on. In particular, electrostatically actuated light modulators, otherwise known as electrostatic light valves in the field of microelectrical mechanical systems (MEMS), may be used to control the propagation of light beams and the intensity thereof in various optical systems.

In most conventional systems, the light valves are comprised of micromirrors whose surfaces are actuated between ON and OFF configurations using digital ON/OFF actuation voltages applied thereon. Generally, one of the ON or OFF configuration corresponds to a flat micromirror surface, a high quality of which being quite difficult to achieve and thus explaining the difficulty in creating high quality systems based on such conventional light valve technology.

Furthermore, most conventional systems must generally operate with digital actuation voltages that provide static ON and OFF positions. As a consequence, grey scale modulation levels potentially available through the application of analog actuation voltages are not available in these systems.

Also, some conventional modulators generally provide a response time which is too long for applications such as ultra-high resolution projection systems.

Recently, a novel light modulator termed Flexible Reflective Analog Modulator, hereinafter referred to as FRAM, has presented significant improvements over like modulators, namely in its ability to overcome some of the above and other drawbacks of conventional modulators. Consequently, the use and application of these FRAMs in various optical apparatuses and systems have yet to be addressed, opening the possibility for a whole new realm of innovations in the fields relying on the use of light modulators, namely relating to optical intensity modulators and image projectors constructed on such technologies.

SUMMARY OF THE INVENTION

It is therefore an aim of the present invention to provide a novel optical apparatus for modifying the divergence of at least one reflected beam, the apparatus comprising at least one Flexible Reflective Analog Modulator (FRAM).

It is also an aim of the present invention to provide a novel optical system for modulating the light intensity of at least one reflected beam, the optical system comprising an optical apparatus for modifying the divergence of at least one reflected beam, and the apparatus comprising at least one Flexible Reflective Analog Modulator (FRAM).

It is a further aim of the present invention to provide a novel image projecting system comprising an optical system for modulating the light intensity of at least one reflected beam, the optical system comprising an optical apparatus for modifying the divergence of at least one reflected beam, the apparatus comprising at least one Flexible Reflective Analog Modulator (FRAM).

Therefore, in accordance with the present invention, there is provided at least one flexible reflective analog modulator (FRAM), each said FRAM generally comprising a set of electrodes for applying an actuation voltage thereon and a flexible reflective member of variable curvature for divergently reflecting an input beam therefrom to produce a reflected beam, said actuation voltage inducing an electrostatic pressure on said flexible reflective member thus altering the shape and curvature of said member and inherently altering the divergence of said reflected beam.

Also in accordance with the present invention, there is provided an optical apparatus for modifying the divergence of at least one reflected beam comprising at least one light source generating at least one input beam, at least one FRAM, an illumination optics comprising at least one lens, said lenses focusing said input beams to produce at least one focused beam, said focused beams each comprising a beam waist, each said FRAM having a FRAM position either in front of, behind or at one of said beam waists thus reflecting said focused beams therefrom and producing at least one reflected beam, the divergence of said reflected beams being determined by the position and curvature of said FRAMs, the latter being controlled by an actuation voltage applied thereon, said actuation voltage possibly being modulated by a waveform that minimizes the FRAM response time.

Also in accordance with the present invention, there is provided an optical system for light intensity modulation comprising the aforementioned optical apparatus for modifying the divergence of at least one reflected beam, and a conversion optics for converting the variable divergence of said reflected beams into variable reflected beam intensities.

Further in accordance with the present invention, there is provided a monochromatic image projector comprising the aforementioned optical system for light intensity modulation coupled with a scanning mechanism and a projection optics. For the operation of said image projector, said FRAMs are preferably configured in at least one linear array, thus producing, when illuminated by an illumination optics designed to address said linear arrays; at least one line of variable intensity light dots. The lines of variable intensity light dots are then scanned by said scanning mechanism and projected through said projection optics to form a bidimensional image.

Still further in accordance with the present invention, there is provided a monochromatic image projector, as described above, comprising an electronic driver performing all FRAM driving functions, said FRAM driving functions comprising data processing, digital to analog conversion, waveform shaping, amplification and offset generation.

Still further in accordance with the present invention, there is provided a multicolour image projector comprising the aforementioned optical system for light intensity modulation coupled with a scanning mechanism and a projection optics. For the operation of said multicolour image projector, said light sources preferably comprise at least 3 laser light sources each operating at different wavelengths, said FRAMs being preferably configured in at least 3 linear arrays, thus producing, when illuminated by an illumination optics designed to address said linear arrays, at least one coloured line of variable intensity light dots. The coloured lines of variable intensity light dots are then combined and scanned by the scanning mechanism and projected through the projection optics to form a bidimensional multicolour image.

Still further in accordance with the present invention, there is provided a multicolour image projector, as described above, comprising an electronic driver performing all FRAM driving functions, said FRAM driving functions comprising data processing, digital to analog conversion, waveform shaping, amplification and offset generation.

Accordingly, the present invention provides an optical apparatus comprising at least one light source generating at least one input beam, at least one Flexible Reflective Analog Modulator (FRAM), said FRAM generally comprising a flexible reflective member attached to a substrate by at least one leg extending outwardly therefrom, an electrode on said substrate and an electrode on said flexible reflective member thus forming a set of electrodes for applying an actuation voltage thereon, the optical apparatus further comprising an illumination optics comprising at least one lens, said lens focusing said input beam to produce at least one focused beam, said focused beam comprising a beam waist, said FRAM having a FRAM position either in front of, behind or at one of said beam waist and a FRAM orientation such that said focused beam is divergently reflected by said flexible reflective member of said FRAM to produce at least one reflected beam therefrom.

The present invention also provides a light intensity modulator comprising: an optical apparatus for variably modifying a divergence of at least one reflected beam comprising at least one light source generating at least one input beam, at least one Flexible Reflective Analog Modulator (FRAM), said FRAM generally comprising a flexible reflective member attached to a substrate by at least one leg extending outwardly therefrom, an electrode on said substrate and an electrode on said flexible reflective member thus forming a set of electrodes for applying an actuation voltage thereon, said FRAM having a natural FRAM curvature in the absence of an actuation voltage applied thereon defined by a natural curvature of said flexible reflective member, and a variable FRAM curvature adjusted by a range of actuation voltages applied thereon, said optical apparatus further comprising an illumination optics comprising at least one lens, said lens focusing said input beam to produce at least one focused beam, said focused beam comprising a beam waist, said FRAM having a FRAM position either in front of, behind or at one of said beam waist and a FRAM orientation such that said focused beam is reflected by said flexible reflective member of said FRAM to produce at least one reflected beam therefrom, said reflected beam reflected by said FRAM having a variable reflected beam divergence dependent on the FRAM position and the variable FRAM curvature of said FRAM, and thus on the range of actuation voltages applied thereon; and a conversion optics for converting the variable reflected beam divergence of said reflected beam into a variable reflected beam intensity.

The present invention further provides an image projector comprising: an optical apparatus for variably modifying the divergence of at least one reflected beam comprising at least one light source generating at least one input beam, a plurality of independently operated Flexible Reflective Analog Modulators (FRAMs) organized in at least one linear FRAM array, said linear FRAM array comprising at least one FRAM, each said FRAM generally comprising a flexible reflective member attached to a flat substrate by at least one leg extending outwardly therefrom, an electrode on said substrate and an electrode on said flexible reflective member thus forming a set of electrodes for applying an actuation voltage thereon, each said FRAM having a natural FRAM curvature in the absence of an actuation voltage applied thereon defined by a natural curvature of said respective flexible reflective member, a variable FRAM curvature adjusted by a range of actuation voltages applied thereon, said optical apparatus further comprising an illumination optics configured to address said linear FRAM array, said illumination optics focusing said input beam to produce at least one focused beam, said focused beam comprising a beam waist, said FRAM array having a FRAM array position either in front of, behind or at one of said beam waist and a FRAM array orientation such that said focused beam is reflected by said flexible reflective members of said FRAMs of said FRAM array to produce a plurality of reflected beams therefrom, each said reflected beam reflected by a respective FRAM of said FRAM array having a variable reflected beam divergence dependent on the respective FRAM position and the variable FRAM curvature of said respective FRAM, and thus on the range of actuation voltages applied thereon; a conversion optics for converting the variable reflected beam divergence of each said reflected beam into a variable reflected beam intensity, said linear FRAM array of independently operated FRAMs thus producing at least one line of variable intensity light dots; and a scanning mechanism coupled to a projection optics, said scanning mechanism scanning through said at least one line of variable intensity light dots in a scanning direction perpendicular thereto, thus projecting, in conjunction with said projection optics, a bidimensional image.

BRIEF DESCRIPTION OF THE DRAWINGS

Having thus generally described the nature of the invention, reference will now be made to the accompanying drawings, showing by way of illustration a preferred embodiment thereof, and in which:

FIG. 1A is a graphical representation illustrating an approximate variation of a reflected beam divergence with FRAM curvature for a micromirror position $z_o=0$;

FIG. 1B is a schematic representation illustrating a FRAM intercepting a focused beam, the FRAM being positioned at the beam waist of the focused beam;

FIG. 4 is a schematic representation illustrating a simplified system for converting the divergence variations of a FRAM-reflected beam into intensity variations of same;

FIG. 10 is a graphical representation illustrating a simulation of a FRAM dynamic response to OFF-ON switching with a two-step actuation waveform–structure dimensions=25 μm×15 μm, mirror thickness=0.1 μm, mirror to substrate distance=2 μm–two-step actuation parameters $t_1$=0.275 μs, $P_1$=9 kPa, $P_2$=15.5 kPa;

FIG. 11A is a schematic representation illustrating the accelerated two-step OFF-ON actuation function;

FIG. 11B is a schematic representation illustrating the accelerated two-step ON-OFF actuation function.

DESCRIPTION OF THE PREFERRED EMBODIMENTS

Figures 2A, 2B:
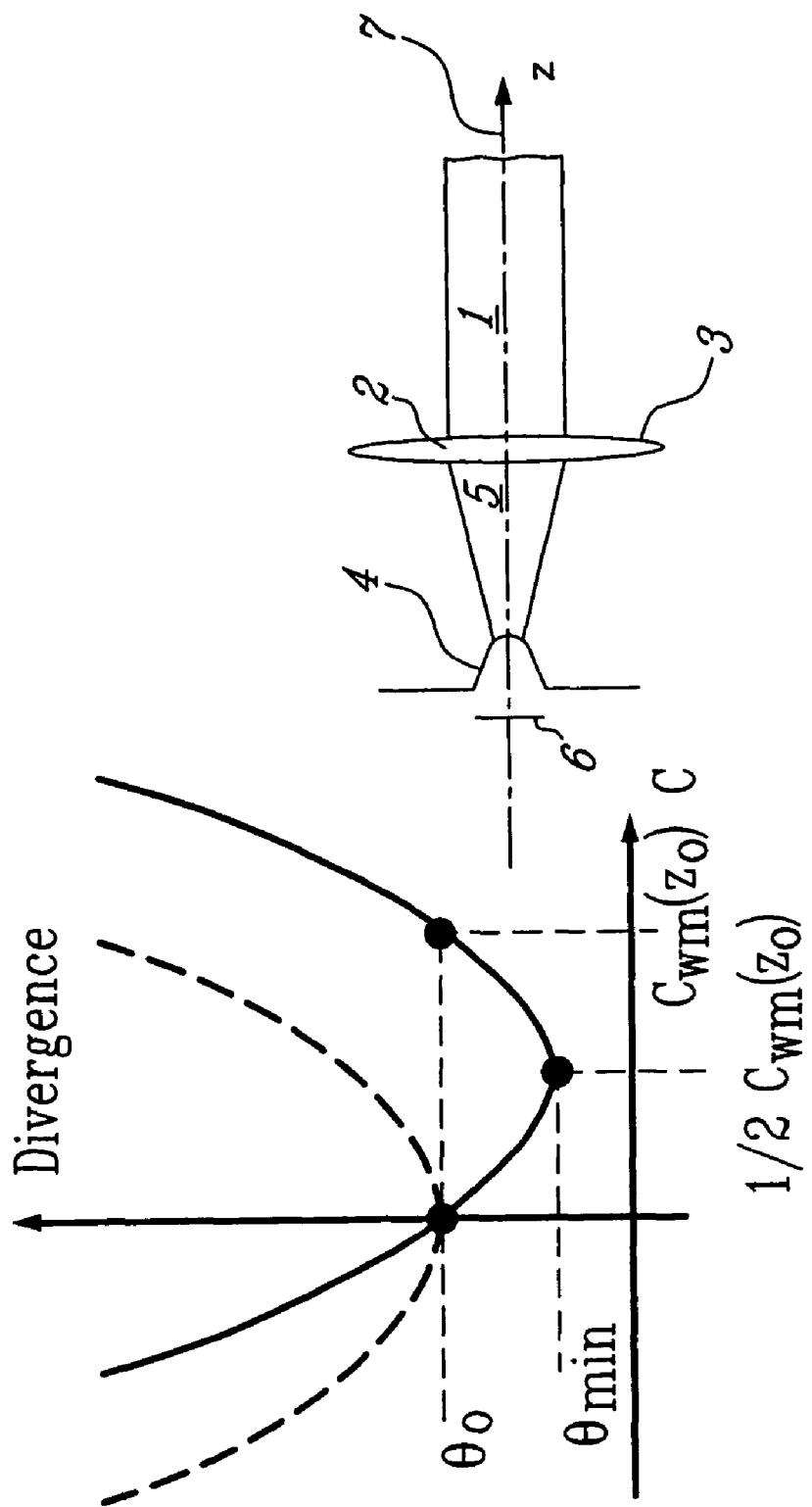
FIG. 2A is a graphical representation illustrating an approximate variation of a reflected beam divergence with FRAM curvature for a positive micromirror position, the dotted curve corresponding to the case $z_o=0$ is presented here for comparison.
FIG. 2B is a schematic representation illustrating a FRAM intercepting a focused beam, the FRAM being positioned in front of the beam waist of the focused beam.

Before proceeding with a detailed description of the present invention, and to fully appreciate the utility of Flexible Reflective Analog Modulators (FRAMs) in same, it is important to review the basic optical and electrical principles associated with the use of FRAMs, and subsequently, in accordance with the preferred embodiment of this invention, to discuss FRAM interactions with a focused laser beam, and other such light sources.

FRAM Basics

The FRAM, as disclosed in U.S. patent application Ser. No. 10/825,044 filed on Apr. 15, 2004 in the names of Alain et al. and which is herewith incorporated by reference generally comprises a thin flexible micromirror suspended over a substrate by two legs extending upwardly therefrom and hingingly supporting the micromirror at opposite ends thereof. As will be apparent to a person of skill in the art, a FRAM structure may be constructed to include one, two, or more legs depending on the actual size and material properties of a given FRAM, possibly selected based on the specific use and application of the FRAM.

Generally, both the micromirror and the substrate comprise an electrode for electrostatic actuation. The electrostatic actuation of the FRAM, that is by applying a voltage across the micromirror and the substrate electrodes, is used to control, for example, the curvature of the FRAM such that an optical beam incident thereon may be controllably reflected therefrom.

Illustratively, when an actuation voltage is applied between the micromirror and substrate electrodes, an electrostatic force causes the micromirror to be pulled down towards the substrate thereby changing the form of the mirror. When the mirror is actuated, it can be curved inward to provide a concave, or conversely convex, reflective surface. When the potential is released, the mirror returns to its rest position due to the restoring forces generated in the FRAM structure, i.e. the material resilience of the micromirror and/or the supporting legs. Consequently, the application of a controllable potential to the substrate and mirror electrodes, for instance using a modulated analog or digital actuation voltage, provides a variably controllable mirror, for example defined by a variably controllable curvature.

The curvature of the unactuated FRAM, that is when no voltage is applied thereon, is an important parameter that should be taken into account for the proper operation of the FRAM. This curvature is caused by the residual internal stress present in the FRAM structure. This internal stress can be controlled through fabrication parameters to achieve a determined residual curvature that can be convex, associated with a compressive stress, or concave, associated with a tensile stress. In practice, the intermediate state corresponding to a flat mirror and nominally zero stress is very difficult to achieve. Typically, convex mirrors are preferred as they offer more flexibility for black level adjustment and a larger mirror stroke that potentially translates into better contrast in the image projection.

For the discussion on the operation of FRAM, the following definitions are adopted. The FRAM curvature has its usual mathematical meaning, that is:

$$C=1/R$$

where C is the FRAM curvature and R is the radius of curvature of the FRAM optical surface. R is positive if the center of curvature is located to the left of the considered optical surface when the illumination beam is incident from the right. With this convention for the radius sign, the curvature of a convex FRAM positioned for reflecting an incoming light beam is positive. In the same position, a concave FRAM has a negative curvature.

FRAM Optics and Optical Systems

Figures 3A, 3B:
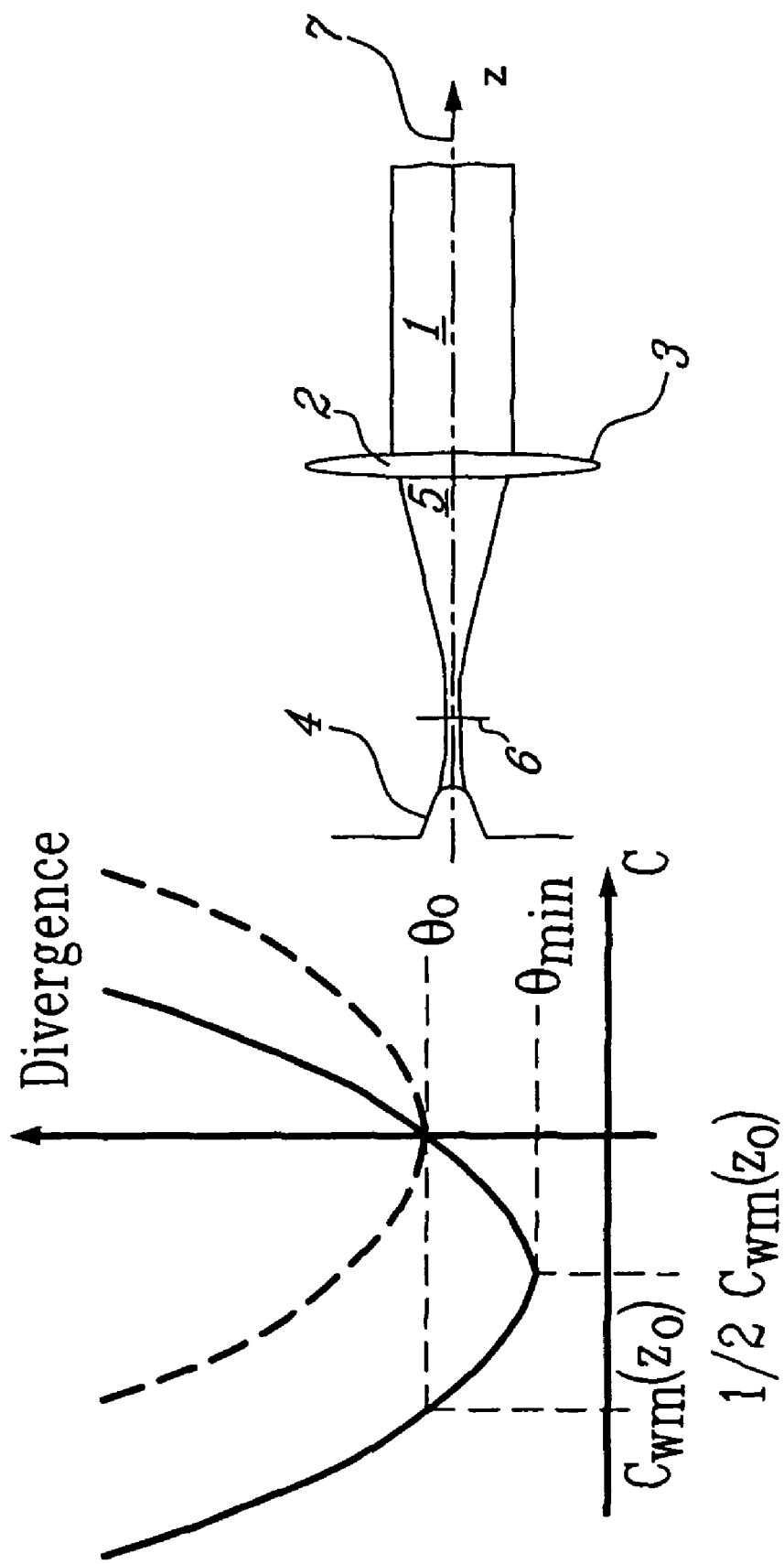
FIG. 3A is a graphical representation illustrating an approximate variation of a reflected beam divergence with FRAM curvature for a negative micromirror position, the dotted curve corresponding to the case $z_o=0$ is presented here for comparison.
FIG. 3B is a schematic representation illustrating a FRAM intercepting a focused beam, the FRAM being positioned behind the beam waist of the focused beam.

In accordance with a preferred embodiment of the present invention, optical arrangements for modifying an incoming laser beam with a FRAM are shown in FIGS. 1B, 2B and 3B. In these configurations, a laser light source is used as an illumination source to generate an input beam 1. An illumination optics 2, comprising at least one lens 3 is used to focus the input beam 1, thus generating a focused beam 5, which is incident on a FRAM 4. The wavefronts of focused beam 5 may be spherical, though alternative illumination optics 2 may be used to modify input beam 1 to generate a focused beam 5 comprising cylindrical wavefronts which, in general, are used more efficiently in producing modulated light with the optical arrangements and systems described below, namely 2-D image projection systems. FRAM 4 can be positioned either in front of (FIG. 2B), behind (FIG. 3B) or at (FIG. 1B) a beam waist 6 of focused beam 5 produced by illumination optics 2. In FIGS. 1, 2 and 3, z is defined as a position along an optical axis 7 from beam waist 6, z being positive toward the illumination source.

Referring now to FIG. 4, input beam 11 is directed through illumination optics 12, comprising at least one lens 13, generating a focused beam 15, which is incident on FRAM 14 at a position 19 along optical axis 17 either in front of, behind or at the beam waist of focused beam 15, thus producing a reflected beam 18 divergently reflected therefrom. In accordance with the present invention, when a gradually increasing voltage is applied to FRAM 14, the curvature of FRAM 14 changes, which inherently modifies the divergence of reflected beam 18 that is being reflected therefrom. A divergent fraction 23 of reflected beam 18 is defined as the fraction of the reflected beam 18 diverging beyond the numerical aperture of illumination optics 12, and thus not being redirected back toward the light source. A returning fraction 24 of reflected beam 18 is defined as the fraction of the reflected beam 18 diverging within the numerical aperture of illumination optics 12, and thus being redirected back toward the light source. Basically, the present invention proposes the use of the above combination of elements as an optical apparatus for modifying the divergence of a reflected beam. Furthermore, by increasing the number of FRAMs and/or the number of focused beams, the same apparatus may be used to modify the divergence of a plurality of reflected beams. To support this proposal, a brief discussion of Gaussian optics as it relates to FRAMs, to focused laser beams incident thereon, and to reflected beams divergently reflected therefrom, is presented hereinafter.

Still referring to FIG. 4, Gaussian optics theory (Mouroulis P. and J. MacDonald, "Geometrical Optics and Optical Design", Oxford University Press, New York, 1997) allows calculation of the divergence of reflected beam 18 as a function of the FRAM curvature:

$$\theta = \theta_o |C| [(2z_o - 1/C)^2 + (2z_R)^2]^{1/2}$$

where $\theta$ is the divergence of reflected beam 18, $\theta_o$ is the divergence of focused beam 15, $z_o$ is the position 19 of FRAM 14 along optical axis 17 with respect to the beam waist of focused beam 15, and $Z_R$ defines the Rayleigh range of focused beam 15. The value of $z_R$ is given by:

$$z_R = (\pi w_o^2)/\lambda$$

where $w_o$ and $\lambda$ are respectively the size of the beam waist, and the wavelength, of focused beam 15. In the discussion below, the FRAM curvature matching the wavefront of focused beam 15 for a given FRAM position $z_o$ is noted $C_{wm}(z_o)$. In that specific case, reflected beam 18 is essentially indiscernible from focused beam 15 as the divergence of the former is identical to the divergence of the latter.

FIG. 1A graphically illustrates the variation of a reflected beam divergence with FRAM curvature for a FRAM position $z_o$ of 0; with reference to FIG. 1B, FRAM 4 is positioned at beam waist 6. In this case, $C_{wm}(z_o)=0$, representing a flat mirror, which also corresponds to the curvature value for which the minimum reflected beam divergence is obtained. In this particular case where $z_o=0$, the minimum reflected beam divergence coincides with the divergence $\theta_o$ of focused beam 5.

FIG. 2A graphically illustrates the variation of a reflected beam divergence with FRAM curvature for a positive FRAM position $z_o>0$; with reference to FIG. 2B, FRAM 4 is positioned in front of beam waist 6. As can be seen, with $z_o$ positive, the minimum divergence $\theta_{min}$ is smaller than $\theta_o$ and is obtained for a FRAM curvature of $C_{wm}(z_o)/2$. For curvature values 0 and $C_{wm}(z_o)$, the reflected beam divergence coincides with the divergence $\theta_o$ of focused beam 5. Referring now to FIG. 4, for a position 19 of FRAM 14 in front of the beam waist of focused beam 15, and for FRAM curvatures $0>C>C_{wm}(z_o)$, the divergence of reflected beam 18 is inferior to the divergence of focused beam 15, implying that reflected beam 18 could be practically entirely redirected through illumination optics 12 in the direction of the light source; the return fraction 24 of reflected beam 18 in this case would thus comprise close to 100% of same. For FRAM curvatures above $C_{wm}(z_o)$ or below 0, the divergence of reflected beam 18 is greater than the divergence of focused beam 15, implying that reflected beam 18 can be discerned from focused beam 15, and the divergent fraction 23 of the reflected beam 18 may be collected by a conversion optics 20, described below. This last condition will be discussed further in association with OFF and ON states of FRAM-based systems.

FIG. 3A is similar to FIG. 2A but with $z_o$ negative. In this case, $C_{wm}(z_o)$ is negative and, as for $z_o$ positive, the minimum divergence $\theta_{min}$ is smaller than $\theta_o$ and is obtained for a FRAM curvature of $C_{wm}(z_o)/2$. Again, for C=0 and $C_{wm}(z_o)$, the divergence value is $\theta_o$, and the same conditions will apply for FRAM OFF and ON states. It is interesting to note that, in general, for a given position $z_o$ other than 0 and a given absolute value of a FRAM curvature, the divergence of a reflected beam is higher for a FRAM curvature with a sign opposite to the sign of $z_o$.

Also as per the present invention, the aforementioned optical apparatus for modifying the divergence of at least one reflected beam is coupled to conversion optics converting variations in the divergence of a reflected beam into variations in the intensity of same. This combination thus provides an optical system for light intensity modulation.

In FIG. 4, a simple configuration for accomplishing the above is illustrated. As previously discussed, input beam 11, provided by a laser light source in a preferred embodiment of the present invention, is directed through illumination optics 12, comprising the at least one lens 13 providing focused beam 15 incident on FRAM 14. As mentioned above, for a reflected beam divergence below a given divergence corresponding to the numerical aperture of lens 13, substantially all of reflected beam 18 is collected by lens 13 and propagated back toward the light source. The divergent fraction 23 is practically null and substantially no light reaches point A. This corresponds to a minimum light intensity and to a nominal black level. When the divergence is increased beyond the numerical aperture of illumination optics 12, the divergent fraction 23 of reflected beam 18 is collected by conversion optics 20, in this FIG. 4 comprised of single lens 21, which focuses the divergent fraction 23 to the point A forming a single light dot 22 (note that herein, the term light dot is meant to include any optical convergence of light into a point, which could be circular, oblong, square or have any other shape). The optical intensity of light dot 22 is inherently dependent on the optical energy confined to the divergent fraction 23 and thus to the divergence of reflected beam 18, which, as seen in FIGS. 1A, 2A and 3A, is strictly dependent on the curvature of FRAM 14 and the position of same relative to the beam waist of focused beam 15. Consequently, as the divergence of reflected beam 18 is gradually increased beyond the numerical aperture of lens 13, so is the intensity of light dot 22 at point A.

Figure 5:
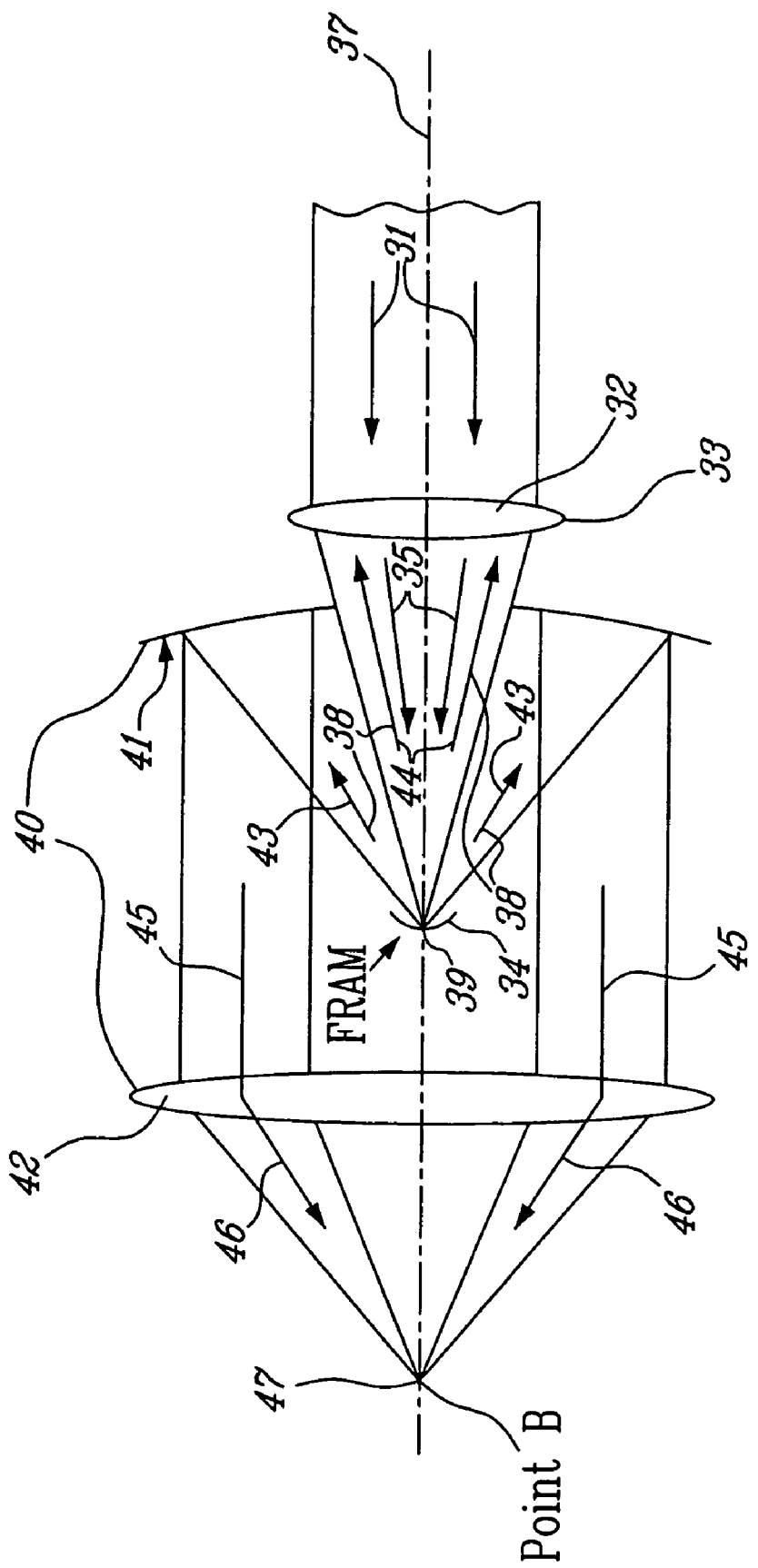
FIG. 5 is a schematic representation illustrating an improved system for converting the divergence variations of a FRAM-reflected beam into intensity variations of same using a primary mirror of a Cassegrain system.

The above example is quite simple and inefficient. Other, better and more efficient optical systems exist to perform the same type of conversion (Cassegrain optics, Schlieren optics, mask arrangements combined with optics, etc. . . . ). FIG. 5 gives an example of such a system based on Cassegrain optics. An input beam 31, provided by a laser light source in a preferred embodiment of the present invention, is directed through an illumination optics 32, again comprised of a single lens 33, providing a focused beam 35 incident on a FRAM 34 at position 39 along optical axis 37 either in front of, behind or at the beam waist of focused beam 35. Again, when the divergence of reflected beam 38 is increased beyond the numerical aperture of lens 33, divergent fractions 43 of reflected beam 38 are collected by a conversion optics 40, this time comprising a Cassegrain system primary mirror 41 and a focusing lens 42, wherein the primary mirror 41 redirects divergent fractions 43 into collimated beams 45, which are ultimately focused by lens 42, with resulting beams 46 converging from lens 42 to a point B forming a single light dot 47 of variable/adjustable intensity.

Without affecting significantly the generality of the present discussion, it can be assumed that the optical system converting divergence change into light intensity modulation is such that a low divergence corresponds to a low light intensity. A person of ordinary skill in the art will understand that a similar system may also be developed wherein the converse is true, that is wherein a low divergence corresponds to a high light intensity. Such systems may also be used in the above and following examples without extending the general scope and nature of the present disclosure.

The above-described optical systems, wherein for instance a low divergence corresponds to a low intensity, generally exhibit a divergence threshold below which the produced light intensity is low and substantially constant. This intensity corresponds to the nominal black level of the optical system. When the divergence produced by the FRAM is above the threshold, the light intensity increases steadily with the absolute value of the FRAM curvature. The divergence threshold should be such that it is possible to position the FRAM to produce divergence values below the divergence threshold for a range of FRAM curvature values. This allows the realization of a high quality black level. Simultaneously, the divergence threshold should be kept as small as possible to maintain the optical system energetic efficiency as high as possible. When both conditions for the divergence threshold selection are fulfilled, it can be seen from FIGS. 2A and 3A that in the cases with $z_o \neq 0$ and for a given threshold, there is a larger curvature range for which the obtained divergence is below the threshold than in the case of $z_o=0$. This translates into a lower sensitivity of the nominal black level adjustment to the FRAM curvature and associated actuation voltage. This lower sensitivity of the black level adjustment in the cases with $z_o \neq 0$ has also an impact on the optical settling time of the black level. In general, as soon as the FRAM mechanical oscillations around the equilibrium position for the black level correspond to curvature values within the range for which the obtained divergence is below the threshold, the black level is stabilized. Therefore, the black level settling time is typically shorter for a larger curvature range with corresponding divergences below the threshold. This means that the black level optical settling time for cases with $z_o \neq 0$ is generally shorter than for the case of $z_o=0$. In the particular case where the divergence threshold of the optical system is between $\theta_o$ and $\theta_{min}$, it is not possible to obtain a high quality black level with $z_o=0$; parameter $z_o$ must be different than 0. It is interesting to note that the presented scheme for light modulation does not rely on an optically flat micromirror state to produce the nominal black level, a common feature of conventional systems. This is an important advantage since such a flat mirror state is difficult to obtain in practice.

Up to this point, the discussion was restricted to optical arrangements comprising a single FRAM, namely an optical apparatus for modifying the divergence of a reflected beam and a light modulating system comprising the optical apparatus and an appropriate conversion optics for converting variations in divergence into variations in intensity. Therefore, also in accordance with the present invention, the aforementioned FRAM-based light modulating system is modified to comprise at least one linear array of FRAMs instead of a single FRAM. In this FRAM array-based light modulating system, the FRAMs are coupled with appropriate illumination and conversion optics to produce at least one line of light dots whose intensities are modulated according to the actuation voltages applied to each FRAM individually. For this configuration, the light beam illuminating the linear FRAM arrays can no longer be composed of a single spherical wavefront train, as generated by an illumination optics comprising a single lens, such as described in FIGS. 4 and 5.

Figure 6:
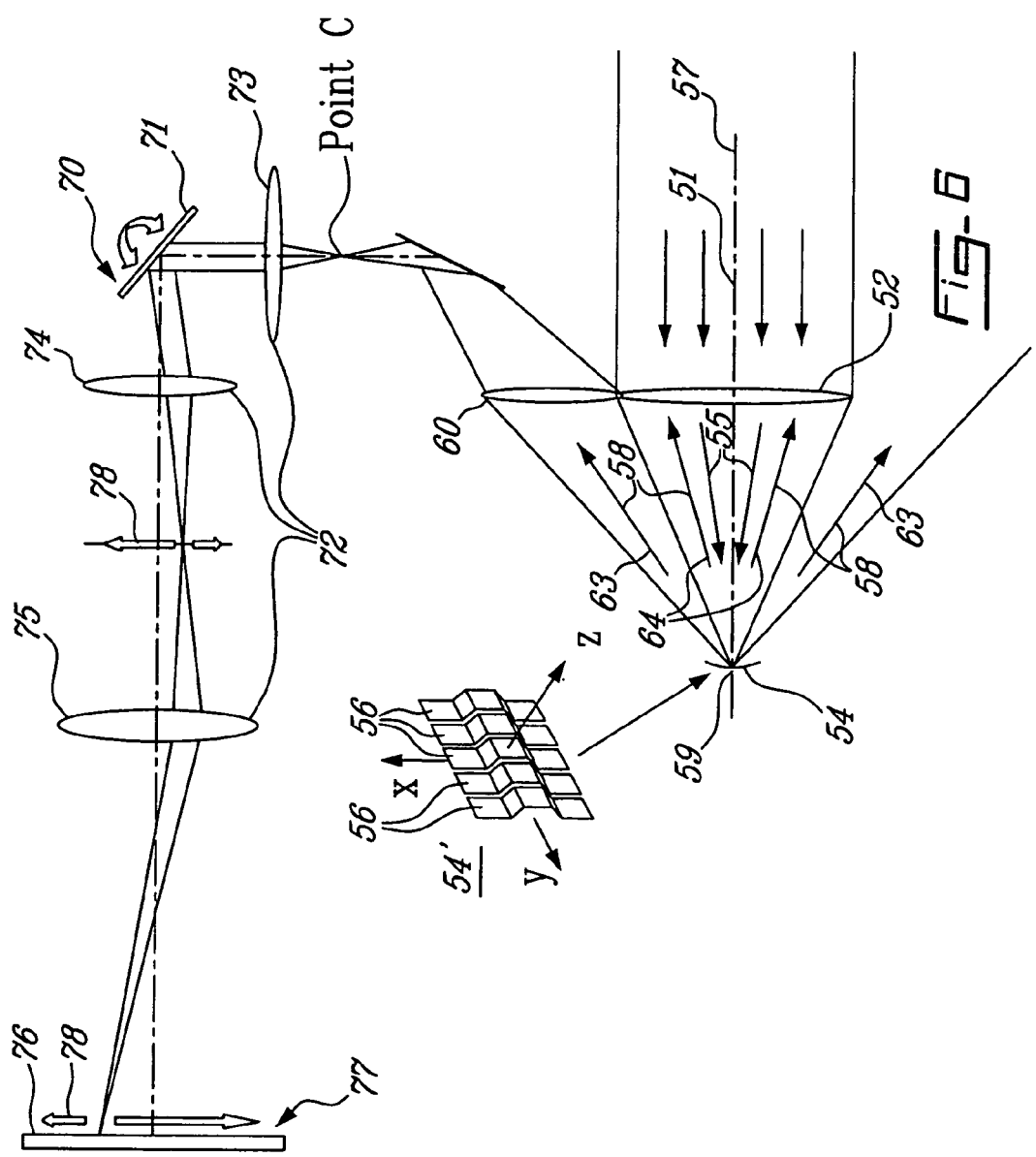
FIG. 6 is a schematic representation illustrating an optical system for projecting a bidimensional image using linear FRAM arrays.

Referring now to FIG. 6, there is defined appropriate illumination optics 52 that can modify the wavefront of an input beam 51 to properly address a FRAM array 54 at a position 59 along optical axis 57 in front of, behind or at an effective beam waist of a focused beam 55. For simplicity, this example will be limited to the illumination of FRAM array 54 comprising a single linear FRAM array 54'. One option is to select the illumination optics 52 such that it produces focused beam 55 comprising cylindrical wavefronts. In practice, the focused beam 55 with cylindrical wavefronts would be represented by a narrow line of light illuminating FRAM array 54. Another option is to illuminate FRAM array 54 with focused beam 55 comprising an array of spots, one light spot corresponding to each FRAM 56 of FRAM array 54. To generate such an illumination pattern from a single Gaussian beam emitted by a laser, illumination optics 52 would comprise either an appropriate diffractive optical element or a microlens array. In each of the above examples, each FRAM 56 of FRAM array 54 would divergently reflect a respective fraction of focused beam 55, generating a plurality of reflected beams 58, the divergence of each reflected beam being dependent on a respective FRAM curvature and position. Reflected beams of divergence greater than the numerical aperture of illumination optics 52 will each comprise a divergent fraction 63 to be converted into a reflected beam intensity, and thus a visible light dot at point C, by appropriate conversion optics 60. Reflected beams of divergence lesser than the numerical aperture of illumination optics 52 will not be collected by conversion optics 60 and will thus generate, in practical terms, a black level light dot at point C. The combined reflected beams will thus generate a line of variable intensity light, dots at point C.

Still in accordance with the present invention, an image projector comprises the combination of the FRAM array-based light modulating system, with a scanning mechanism and a projection optics. Still referring to FIG. 6, the light modulating system described above is coupled to a scanning mechanism 70, in this example comprising a single flat mirror scanner 71, and projection optics 72, here comprising lenses 73; 74 and 75, capable of displaying a 2-D image 76 on a screen 77. The line of light dots (i.e. pixels) of variable intensities produced at point C by FRAM array 54, the FRAM array 54 still comprising one linear FRAM array 54', is scanned across screen 77, in a scan direction 78 perpendicular to the line of light dots, through projection optics 72. The information controlling the actuation voltage of each FRAM 56, and therefore the intensity of each light dot at point C, is updated for each displayed line throughout the scan process. This produces a 2-D image 76 composed of light dots of variable intensity. Due to the typically short response time of the FRAMs, namely below 5 µs, the resulting system allows display of thousands of image lines at high a frame rate.

Necessarily, the above configuration, when comprising a single laser light source, provides a monochromatic projection system. Another embodiment of the present invention comprises an immediate extension of this monochromatic projection system. In general, a multicolour projection system can be achieved by using at least two laser light sources operating at different wavelengths. For instance, three light sources operating at different wavelengths and thus providing three coloured beams possibly of colours red, green and blue, could be used in a multicolour projection system to provide most colours in the visible spectrum. For example, still referring to FIG. 6, a multicolour projection system comprises three conversion optics 60 adapted to address the divergent fractions 63 of three reflected beams 58 of different colors, each controlled by respective FRAM arrays 54'. The latter are positioned at respective positions 59 along optical axis 57 either in front of, behind or at the effective beam waists of respective focused beams 55. Each coloured beam is directed by an appropriate illumination optics 52 to a respective linear FRAM array 54' to produce, in conjunction with an appropriate conversion optics 60, at least one line of light dots of a given colour. The three lines of light dots of different colours are then combined and propagated toward a scanner and a projection optics to produce a 2-D colour image on screen 77.

As will be apparent to a person of ordinary skill in the art, other optical setups and system configurations can be applied to the systems presented herein without departing from the general scope and nature of the present disclosure. For instance, many other types of illumination optics, conversion optics and scanning/projection mechanisms may be considered to provide a similar result. Furthermore, other light sources may be used to replace the laser light sources described herein. It will be readily understood that the FRAM systems can be designed to benefit from the great versatility and applicability of the FRAM technology to develop various optical solutions unavailable with conventional light valves.

FRAM Actuation Voltage Waveforms and Electronics

In a preferred embodiment of the present invention, the actuation voltages applied individually to each FRAM of a FRAM array are modulated by an electronic driver, specifically designed for the control of the FRAM array, using predetermined waveforms to reduce the response time of each FRAM. Reduced response times inherently improve the frame rate and resolution of the aforementioned monochromatic and multicolour projection systems.

To illustrate the effectiveness of such actuation waveforms, dynamic response simulations of various FRAM microstructures under the influence of various actuation voltage waveforms are presented hereinbelow. Though the illustrated results of the following discussion refer to simulated FRAM responses to various actuation voltages, experimental results have also been obtained for similar actuation conditions to support the following. For instance, experimental FRAM responses to ramp-like actuation voltages, as will be discussed further with reference to the simulated results of FIG. 9, confirm the impact of such actuation voltage waveforms and their ability to improve the responsiveness and accuracy of FRAM-based systems.

Figure 7:
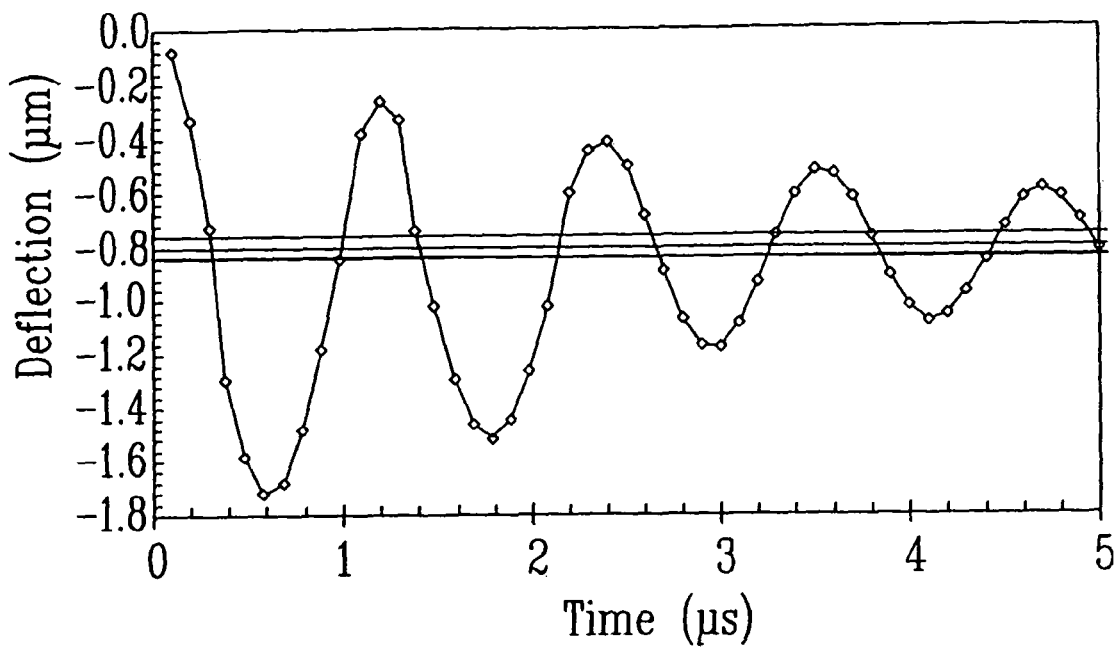
FIG. 7 is a graphical representation illustrating a simulation of a FRAM dynamic response to a 158V step function–structure dimensions=25 μm×25 μm, mirror thickness=0.15 μm, mirror to substrate distance=4.5 μm.

Referring first to FIG. 7, a simulation of the response of a FRAM microstructure to a voltage waveform in the shape of a simple step function shows that the FRAM microstructure is clearly underdamped; simulations were performed for a 25 µm×25 µm micromirror structure with a mirror thickness of 0.15 µm and an electrode-to-mirror gap of 4.5 µm. This causes the FRAM to overshoot and oscillate around its equilibrium position for a relatively long time. The FRAM stabilization time is a critical parameter for projection applications due to its effect on the achievable resolution in the scan direction. Alternate voltage waveforms can be used to minimize the oscillations of the FRAM.

Various voltage waveforms, inherently corresponding to electrostatic pressure waveforms since the electrostatic pressure is proportional to the square of the voltage, can be used to reduce the FRAM settling time. For example, exponentially varying voltage waveforms have been investigated. Such waveforms are mathematically described as:

$V = V_o(1 - e^{-t/\tau})$ (0 µm to maximum deflection: actuation)

Figure 8:
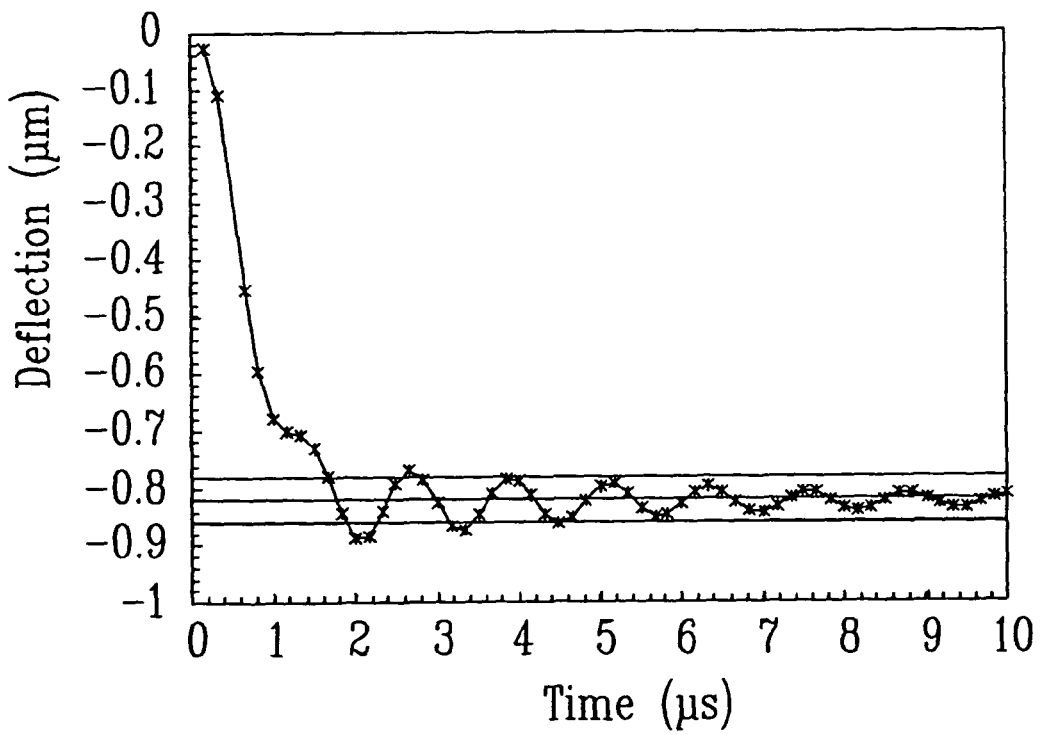
FIG. 8 is a graphical representation illustrating a simulation of a FRAM dynamic response (FRAM dimensions as in FIG. 10) to an exponential voltage variation with a time constant of 0.43 μs.

$V = V_o e^{-t/\tau}$ (maximum deflection to 0 µm: deactuation)

where $\tau$ is the time constant of the exponential waveform and $V_o$ the voltage required to reach a specified micromirror curvature. Simulations using such exponential waveforms to activate a FRAM, of same structure dimensions as that studied in FIG. 7, are presented in FIG. 8. These results indicate that it is possible to reduce the FRAM oscillations significantly by selecting the time constant of the exponential waveform carefully. For the structure considered, a time constant of 0.43 µs achieves settling times typically shorter than 5 µs and even times below 2 µs. These dynamic results were obtained for mirror actuation. When the inverse case is considered (mirror deactuation), it becomes more difficult to reduce mirror oscillations using pressure variations corresponding to an exponentially decreasing voltage since pressure is a non-linear function of applied voltage. For the same structure, activated with a voltage decreasing exponentially with a time constant of 0.43 µs (see FIG. 9), the settling time is about 9 µs. If the time constant is increased to 3.26 µs, the settling time decreases to 5.3 µs which is similar to the settling time of a mirror actuation obtained with a time constant of 0.43 µs.

Figure 9:
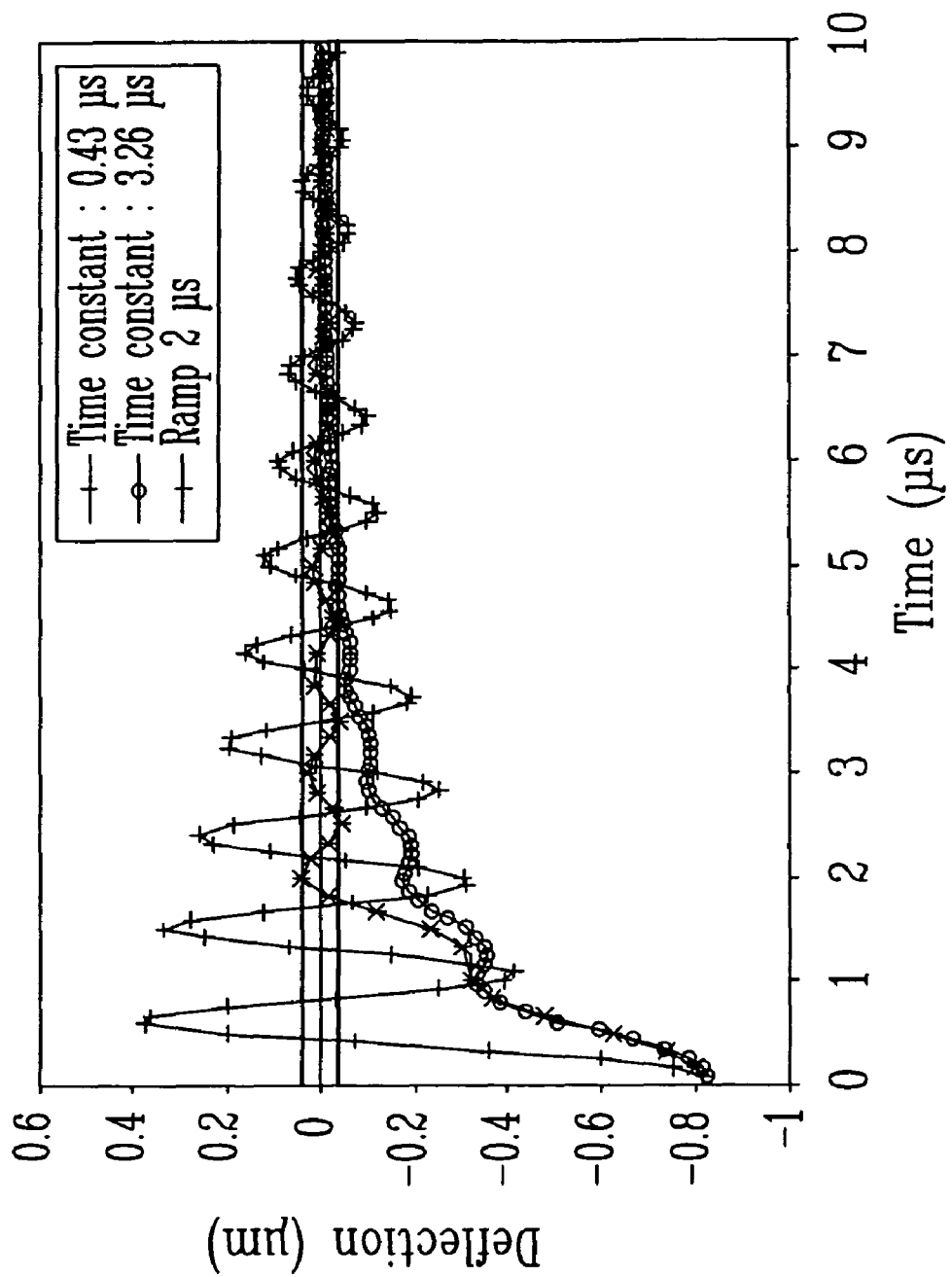
FIG. 9 is a graphical representation illustrating a simulation of a FRAM dynamic response (FRAM dimensions as in FIG. 10) for decreasing exponential voltage variations and a decreasing pressure ramp.

The dynamic response of a FRAM, of same structure dimensions as that studied in FIG. 7, to a decreasing electrostatic pressure ramp of the form:

$P = P_o(1 - t/\delta)$, $0 < t < \delta$ $P = 0$, $t \geq \delta$ which corresponds to a voltage waveform of the form:

$V \propto P_o^{1/2}(1 - t/\delta)^{1/2}$, $0 < t < \delta$ $V = 0$, $t \geq \delta$ where $P_o$ is the initial pressure and $\delta$ the ramp duration, is also presented in FIG. 9 using $\delta = 2$ µs. This indicates that this type of pressure variation is effective in reducing the FRAM oscillations if the ramp duration $\delta$ is carefully selected. In the example shown, the time required to stabilize the FRAM is as short as 2.6 µs. As stated hereinabove, experimental results applying such ramp-like actuation voltage waveforms also support these simulated results.

Another way to limit the oscillations of the FRAM is to take advantage of the speed reduction occurring each half period of the FRAM oscillation. This leads to the so-called two-step function actuation described below. At t=0, a first step function is applied with a pressure load $P_1$ selected to achieve FRAM overshoot down to the target equilibrium position $z_{eq}$. At time $t_1$, defined as the time corresponding to the FRAM displacement $z_{eq}$, the velocity is null. A second step function is then applied with a pressure load $P_2$ providing static equilibrium at $z_{eq}$. Because at $t_1$ the electrostatic force is made equal to the restoring force, the equation for the FRAM dynamics becomes $m\ddot{z} = 0$ with initial conditions $\dot{z}(t_1) = 0$ and $z(t_1) = z_{eq}$. This leads to $z(t) = z_{eq}$. Ideally, after $t_1$, the structure is stopped at the target position. Simulations were performed for a 25 µm×15 µm micromirror structure with a thickness of 0.1 µm and an electrode to mirror gap of 2 µm (see FIG. 13). In this case, $P_1 = 9$ kPa and $t_1 = 0.275$ µs. The stabilization is reached after 0.29 µs. Almost no oscillations are observed in this example.

A modified version of the two-step actuation function, the so-called accelerated two-step function, can also be used. The principle here is to accelerate the FRAM by applying a larger pressure $P_1$ during a time $t'_1$, shorter than $t_1$. The deceleration down to $z_{eq}$ is still due to the restoring and damping forces. FIGS. 11A and 11B present the schematic diagrams of z(t) and P(t) for this type of OFF-ON and ON-OFF actuation waveforms, respectively. The accelerated two-step function requires the application of a high voltage but this voltage can be fixed while $t'_1$ only is varied. Only the range of the pressure $P_2$ needs to have a high resolution and it remains the same for all types of actuations because it determines the precision of the equilibrium position. This actuation function provides potentially shorter response times and the same theoretical advantages as the two-step function.

Another possible actuation waveform worth mentioning is a filtered step function. The filter applied to the step function eliminates frequencies corresponding to the lower resonant frequencies of the device from the step function spectrum. This is effective in reducing the energy coupled into the preferred oscillating modes of the device, which, in turn, minimizes overshoot, unwanted oscillations and response time.

Besides providing the appropriate actuation waveform to minimize the FRAM response time, the electronic driver powering and controlling the FRAMs must perform a set of functions essential to its proper operation. It must be possible to apply an offset voltage to FRAM micromirrors to adjust their low voltage curvature. A coarse offset voltage can also be applied to the common electrode located underneath all the micromirrors, thus generating an identical coarse offset value for all the micromirrors in the array. It must also be possible to select a fine offset value for each individual micromirror to be directly applied thereon. This way, the total offset value for each micromirror may be adjusted to correct for possible irregularities arising from micromirror to micromirror. The individual offset values result from a calibration procedure and can be loaded in the driver circuit only once before operating the FRAMs. The actuation voltage values corresponding to the required grey levels are added to the individual offset values and applied on each micromirror. A high actuation voltage resolution of at least 11 bits is required to allow for the implementation of data processing algorithms that correct for the gamma function and for the irregularities among mirrors. The data set activating the FRAM array must be refreshed simultaneously for all micromirrors up to 300,000 times per second. In the context of 2-D image projection, this would allow the display of up to 5000 image lines at a frame rate of 60 Hz. As already mentioned, features (for example, selectable time constant for exponentially varying actuation voltage) must be included to the electronic driver to provide some flexibility in adjusting the actuation waveform shape to minimize the micromirror overshoot and settling time.

Figure 12:
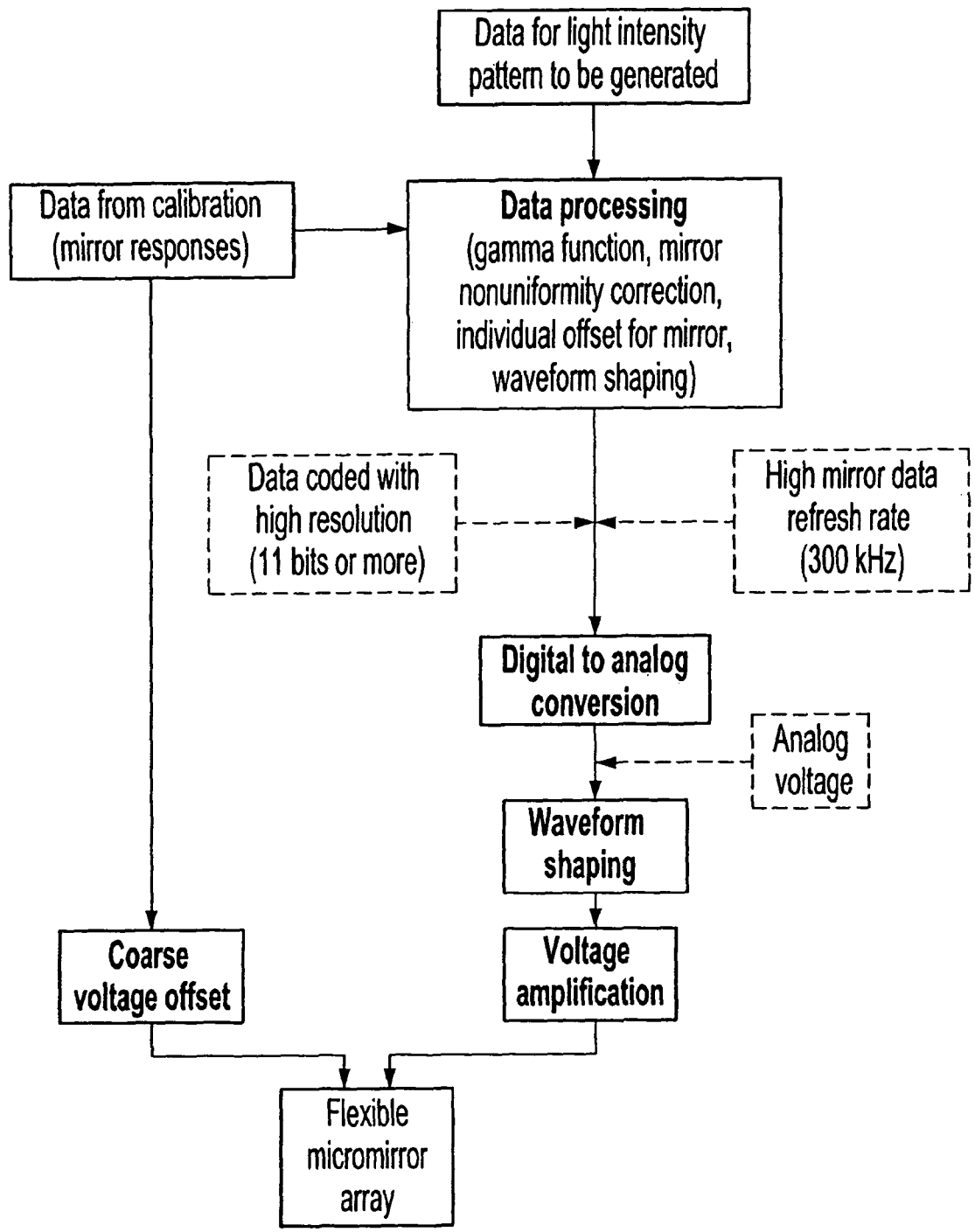
FIG. 12 is a block diagram illustrating of an electronic driver designed for the control of a FRAM array, wherein blocks with bold characters are part of the driver, while dotted blocks constitute comments.

FIG. 12 presents a block diagram summarizing the features of an electronic driver specifically designed for the proper control of a FRAM array in accordance with the present invention. The data carrying the information required to generate the light intensity pattern, as well as the calibration data of the system in question, is fed through a data processing algorithm which computes the actuation voltage to be applied to each FRAM, taking into account the gamma function, the mirror irregularity correction determined during calibration, the individual offset required of each mirror, and waveform shaping. The digital data, coded at a high resolution, namely 11 bits or more, and processed for a high mirror data refresh rate, namely in the range of 300 kHz, is converted to an analog voltage of appropriate waveform, which is further amplified before being applied to the FRAM array. Additionally, the calibration data of the system is utilized to set a static coarse voltage offset to all FRAMs. Ultimately, the fully calibrated and optimized FRAM based image projector will be able to produce up to 5000 colour image lines at a frame rate of 60 Hz.

As presented herein, FRAM-based optical systems can be used in a variety of applications. Namely, the use of FRAMs to provide accurately controlled light modulation, for instance in high-resolution projection systems, can be highly beneficial over the use of conventional light valves.

For example, the simple construction of the FRAMs renders FRAMS easy and less costly to produce. Furthermore, the rapid response time of the FRAMs allows for the creation of dynamic 2D images using line-by-line imaging from a single line array of micro-modulators, as opposed to the 2D arrays required by slower modulators, which are generally much more difficult to construct. Also, FRAM systems do not rely on an optically flat micromirror state to produce a good black (or white) level, optically flat micromirror states being generally difficult to achieve. Still further, the FRAM systems may support analog as well as digital actuation voltages and waveforms thereby allowing for the greater control and application of black, white and various grey level states. Ultimately, FRAM-based systems provide greater applicability and versatility through improved control, actuation and design options and characteristics.

While this invention has been described with reference to the illustrative embodiments, this description is not intended to be construed to a limiting sense. Various modifications or combinations of the illustrative embodiments, as well as other embodiments of the invention, will be apparent to persons skilled in the art upon reference to the description. It is therefore intended that the described invention encompass any such modifications or embodiments.

We claim:

1. A light intensity modulator comprising:
an optical apparatus for variably modifying a divergence of at least one reflected beam comprising at least one light source generating at least one input beam, at least one Flexible Reflective Analog Modulator (FRAM), said FRAM generally comprising a flexible reflective member attached to a substrate by at least one leg extending outwardly therefrom, an electrode on said substrate and an electrode on said flexible reflective member thus forming a set of electrodes for applying an actuation voltage thereon, said FRAM having a natural FRAM curvature in the absence of an actuation voltage applied thereon defined by a natural curvature of said flexible reflective member, and a variable FRAM curvature adjusted by a range of actuation voltages applied thereon, said optical apparatus further comprising an illumination optics comprising at least one lens, said lens focusing said input beam to produce at least one focused beam, said focused beam comprising a beam waist, said FRAM having a FRAM position either in front of, behind or at said beam waist and a FRAM orientation such that said focused beam is reflected by said flexible reflective member of said FRAM to produce at least one reflected beam therefrom, said reflected beam reflected by said FRAM having a variable reflected beam divergence dependent on the FRAM position and the variable FRAM curvature of said FRAM, and thus on the range of actuation voltages applied thereon; and
a conversion optics for converting the variable reflected beam divergence of said reflected beam into a variable reflected beam intensity.

2. The light intensity modulator as claimed in claim 1, wherein said light source comprises a laser.

3. The light intensity modulator as claimed in claim 1, wherein said FRAM has a FRAM position in front of said beam waist.

4. The light intensity modulator as claimed in claim 1, wherein said FRAM has a FRAM position behind said beam waist.

5. The light intensity modulator as claimed in claim 1, wherein said FRAM has a FRAM position at said beam waist.

6. The light intensity modulator as claimed in claim 1, wherein said range of actuation voltages can be determined and applied to each said FRAM individually, each said FRAM thus being an independently operated FRAM.

7. The light intensity modulator as claimed in claim 1, wherein said conversion optics comprises either Cassegrain optics, Schlieren optics, mask arrangements combined with optics, or any combination thereof.

8. The light intensity modulator as claimed in claim 1, comprising an electronic driver performing all FRAM driving functions required for the proper operation of said FRAM.

9. The light intensity modulator as claimed in claim 8, wherein said FRAM driving functions comprise light modulation data processing.

10. The light intensity modulator as claimed in claim 8, wherein said FRAM driving functions comprise digital-to-analog data conversion.

11. The light intensity modulator as claimed in claim 8, wherein said FRAM driving functions comprise actuation voltage amplification.

12. The light intensity modulator as claimed in claim 8, wherein said FRAM driving functions comprise coarse and fine offset generation.

13. The light intensity modulator as claimed in claim 8, wherein said range of actuation voltages are applied using at least one actuation voltage waveform constructed to minimize the response time of said FRAM.

14. The light intensity modulator as claimed in claim 13, wherein said actuation voltage waveform comprises either an exponentially varying voltage waveform, a decreasing or increasing electrostatic pressure ramp waveform, a two-step function actuation waveform, an accelerated two-step actuation waveform, a filtered step function waveform, or any combination thereof.

15. The light intensity modulator as claimed in claim 13, wherein said FRAM driving functions comprise actuation voltage waveform shaping.

16. The light intensity modulator as claimed in claim 1, comprising a plurality of FRAMs organized in at least one FRAM array, said FRAM array comprising at least two FRAMs.

17. The light intensity modulator as claimed in claim 16, wherein said FRAM array comprises at least one linear FRAM array.

18. The light intensity modulator as claimed in claim 17, wherein said illumination optics is configured to address said linear FRAM array.

19. The light intensity modulator as claimed in claim 18, wherein said illumination optics comprise either a microlens array, a diffraction grating, an optics for generating a focused beam comprising cylindrical wavefronts, or any combination thereof.

20. The light intensity modulator as claimed in claim 18, wherein said range of actuation voltages can be determined and applied to each said FRAM individually, each said FRAM thus being an independently operated FRAM.

21. The light intensity modulator as claimed in claim 20, wherein each linear FRAM array of independently operated FRAMs produces at least one line of variable intensity light dots.

22. An image projector comprising:

an optical apparatus for variably modifying the divergence of at least one reflected beam comprising at least one light source generating at least one input beam, a plurality of independently operated Flexible Reflective Analog Modulators (FRAMs) organized in at least one linear FRAM array, said linear FRAM array comprising at least one FRAM, each said FRAM generally comprising a flexible reflective member attached to a flat substrate by at least one leg extending outwardly therefrom, an electrode on said substrate and an electrode on said flexible reflective member thus forming a set of electrodes for applying an actuation voltage thereon, each said FRAM having a natural FRAM curvature in the absence of an actuation voltage applied thereon defined by a natural curvature of said respective flexible reflective member and a variable FRAM curvature adjusted by a range of actuation voltages applied thereon, said optical apparatus further comprising an illumination optics configured to address said linear FRAM array, said illumination optics focusing said input beam to produce at least one focused beam, said focused beam comprising a beam waist, said FRAM array having a FRAM array position either in front of, behind or at said beam waist and a FRAM array orientation such that said focused beam is reflected by said flexible reflective members of said FRAMs of said FRAM array to produce a plurality of reflected beams therefrom, each said reflected beam reflected by a respective FRAM of said FRAM array having a variable reflected beam divergence dependent on the respective FRAM position and the variable FRAM curvature of said respective FRAM, and thus on the range of actuation voltages applied thereon;

a conversion optics for converting the variable reflected beam divergence of each said reflected beam into a variable reflected beam intensity, said linear FRAM array of independently operated FRAMs thus producing at least one line of variable intensity light dots;

a scanning mechanism coupled to a projection optics, said scanning mechanism scanning through said at least one line of variable intensity light dots in a scanning direction perpendicular thereto, thus projecting, in conjunction with said projection optics, a bidimensional image.

23. The image projector as claimed in claim 22, wherein said light source comprises a laser.

24. The image projector as claimed in claim 22, wherein each said FRAM has a FRAM position in front of said beam waist.

25. The image projector as claimed in claim 22, wherein each said FRAM has a FRAM position behind said beam waist.

26. The image projector as claimed in claim 22, wherein each said FRAM has a FRAM position at said beam waist.

27. The image projector as claimed in claim 22, wherein said illumination optics comprises either a microlens array, a diffraction grating, an optics for generating a focused beam comprising cylindrical wavefronts, or any combination thereof.

28. The image projector as claimed in claim 22, wherein said conversion optics comprises either Cassegrain optics, Schlieren optics, mask arrangements combined with optics, or any combination thereof.

29. The image projector as claimed in claim 22, comprising an electronic driver performing all FRAM driving functions required for the proper operation of said FRAMs.

30. The image projector as claimed in claim 29, wherein said FRAM driving functions comprise light modulation data processing.

31. The image projector as claimed in claim 29, wherein said FRAM driving functions comprise digital-to-analog data conversion.

32. The image projector as claimed in claim 29, wherein said FRAM driving functions comprise actuation voltage amplification.

33. The image projector as claimed in claim 29, wherein said FRAM driving functions comprise coarse and fine offset generation.

34. The image projector as claimed in claim 29, wherein said range of voltages is applied using at least one actuation voltage waveform constructed to minimize the response time of said FRAMs.

35. The image projector as claimed in claim 34, wherein said actuation voltage waveform comprises either an exponentially varying voltage waveform, a decreasing or increasing electrostatic pressure ramp waveform, a two-step function actuation waveform, an accelerated two-step actuation waveform, a filtered step function waveform, or any combination thereof.

36. The image projector as claimed in claim 34, wherein said FRAM driving functions also comprise actuation voltage waveform shaping.

37. The image projector as claimed in claim 22, wherein said at least one light source comprises at least two laser light sources, said laser light sources operating at different wavelengths, each said laser light source illuminating a respective said linear FRAM array, each said respective linear FRAM array generating a respective line of said variable intensity light dots, said lines of variable intensity light dots being combined to form a multicoloured line of variable intensity light dots to be directed toward said scanning mechanism and said projection optics to produce a bidimensional multicolour image.

38. The image projector as claimed in claim 37, wherein said wavelengths represent additive colours.

39. The image projector as claimed in claim 38, wherein said additive colours comprise red, green and blue.

* * * * *